(12) United States Patent
Guarnaccia et al.

(10) Patent No.: US 11,042,655 B2
(45) Date of Patent: Jun. 22, 2021

(54) DECRYPTION METHOD AND CIRCUIT, CORRESPONDING DEVICE

(71) Applicant: STMICROELECTRONICS S.R.L., Agrate Brianza (IT)

(72) Inventors: Giuseppe Guarnaccia, Augusta (IT); Rosalino Critelli, Misterbianco (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 291 days.

(21) Appl. No.: 16/296,009

(22) Filed: Mar. 7, 2019

(65) Prior Publication Data

US 2019/0278926 A1    Sep. 12, 2019

(30) Foreign Application Priority Data

Mar. 8, 2018   (IT) .................. 102018000003373

(51) Int. Cl.
| | |
|---|---|
| *G06F 21/00* | (2013.01) |
| *G06F 21/60* | (2013.01) |
| *G06F 21/62* | (2013.01) |
| *G06F 21/85* | (2013.01) |
| *H04L 9/06* | (2006.01) |
| *G06F 21/74* | (2013.01) |

(52) U.S. Cl.
CPC .......... *G06F 21/606* (2013.01); *G06F 21/602* (2013.01); *G06F 21/6227* (2013.01); *G06F 21/74* (2013.01); *G06F 21/85* (2013.01); *H04L 9/0631* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 2005/0021986 A1 | 1/2005 | Graunke et al. | |
| 2007/0050642 A1* | 3/2007 | Flynn | G06F 21/78 713/192 |
| 2007/0140477 A1 | 6/2007 | Wise | |
| 2007/0162610 A1* | 7/2007 | Un | H04W 80/02 709/230 |
| 2013/0080790 A1 | 3/2013 | Pean et al. | |
| 2016/0021401 A1 | 1/2016 | LaBosco et al. | |
| 2016/0171249 A1 | 6/2016 | Circello et al. | |
| 2016/0364343 A1* | 12/2016 | Case | H04L 9/0637 |

* cited by examiner

*Primary Examiner* — Andrew J Steinle
(74) *Attorney, Agent, or Firm* — Seed Intellectual Property Law Group LLP

(57) ABSTRACT

A method for data decryption comprises receiving, over an AXI bus operating in burst mode, data access requests for data units stored in a memory, subdividing the requests received into requests for encrypted data units and requests for non-encrypted data units, forwarding both requests for encrypted data units and requests for non-encrypted data units towards the memory, retrieving the respective sets of data units over the AXI bus, and applying Advanced Encryption Standard, AES, processing to the requests for encrypted data units by calculating decryption masks for the encrypted data units and applying the decryption masks calculated to the encrypted data units retrieved. Subdividing the requests into requests for encrypted data units and requests for non-encrypted data units is performed depending on data start addresses and security information conveyed by the requests.

20 Claims, 2 Drawing Sheets

DECRYPTION METHOD AND CIRCUIT, CORRESPONDING DEVICE

BACKGROUND

Technical Field

The description relates to decryption techniques.

One or more embodiments may be applied to decryption engines for, e.g., external memory access through Advanced Extensible Interface (AXI) buses.

Description of the Related Art

Microcontrollers such as, e.g., STM32 microcontrollers (as available with companies of the ST group) are introducing an increasing number of security features which can also run on high-performance buses.

Basic encryption/decryption processing may introduce latency which is hardly compatible with high-performance bus operation, where "on the fly" decryption may represent a desirable feature, as in code execution from external memory.

BRIEF SUMMARY

Despite the extensive activity in the area, further improved solutions are desirable.

For instance, solutions are desirable which may facilitate, e.g., fast execution of encrypted code (and data burst read) with reduced impact on silicon area and latency, e.g., on a 64-bit AXI bus interface.

According to one or more embodiments, a method includes:

receiving over an Advanced Extensible Interface (AXI) bus data access requests for data units stored in a memory, wherein the AXI bus operates in burst mode, wherein the requests comprise burst requests for access to respective sets of data units stored in the memory starting from respective data start addresses, the burst requests conveying said respective data start addresses and security information indicative of whether the data units requested in the burst requests are encrypted or non-encrypted data units;

reading the data start addresses and the security information conveyed by the burst requests, subdividing the burst requests received, as a function of said data start addresses and said security information, into burst requests for encrypted data units and burst requests for non-encrypted data units, forwarding both the burst requests for encrypted data units and the burst requests for non-encrypted data units towards the memory, and retrieving the encrypted and non-encrypted data units from the memory over the AXI bus; and applying Advanced Encryption Standard (AES) processing to the burst requests for encrypted data units by calculating decryption masks for the encrypted data units and applying the decryption masks to the encrypted data units retrieved.

One or more embodiments may relate to a corresponding circuit.

One or more embodiments may relate to a corresponding device.

The claims are an integral part of the technical teaching provided herein in respect of the embodiments.

One or more embodiments may provide a hardware solution, suitable to be plugged on an AXI bus for cooperation with a memory controller.

One or more embodiments may involve a deep pipeline to perform address decoding, generation and decryption in parallel, e.g., during Advanced Encryption Standard (AES) mask mining.

One or more embodiments may benefit from the "outstanding" capability of the AXI bus (i.e., the capability of issuing several AXI requests pending a response), without introducing latency.

One or more embodiments may rely on a decryption engine based on a finite state machine (FSM) solution performing "speculative" trigger of AES mask generation and AXI burst field extraction to manage in an improved way the response data flow.

One or more embodiments may thus address the problem of fast execution of encrypted code (and data burst read) with reduced area impact and/or reduced latency impact on, e.g., a 64-bit AXI bus interface.

One or more embodiments facilitate providing an optimized decryption engine on AXI buses, enabling code protection and fast code execution from external memory.

For instance, one or more embodiments may permit microcontroller users to make available to third parties protected firmware for execution without disclosing the content.

One or more embodiments may be applied, e.g., to general purpose, high-performance microcontrollers (MCUs) as increasingly used, e.g., in the area of IoT (Internet of Things).

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
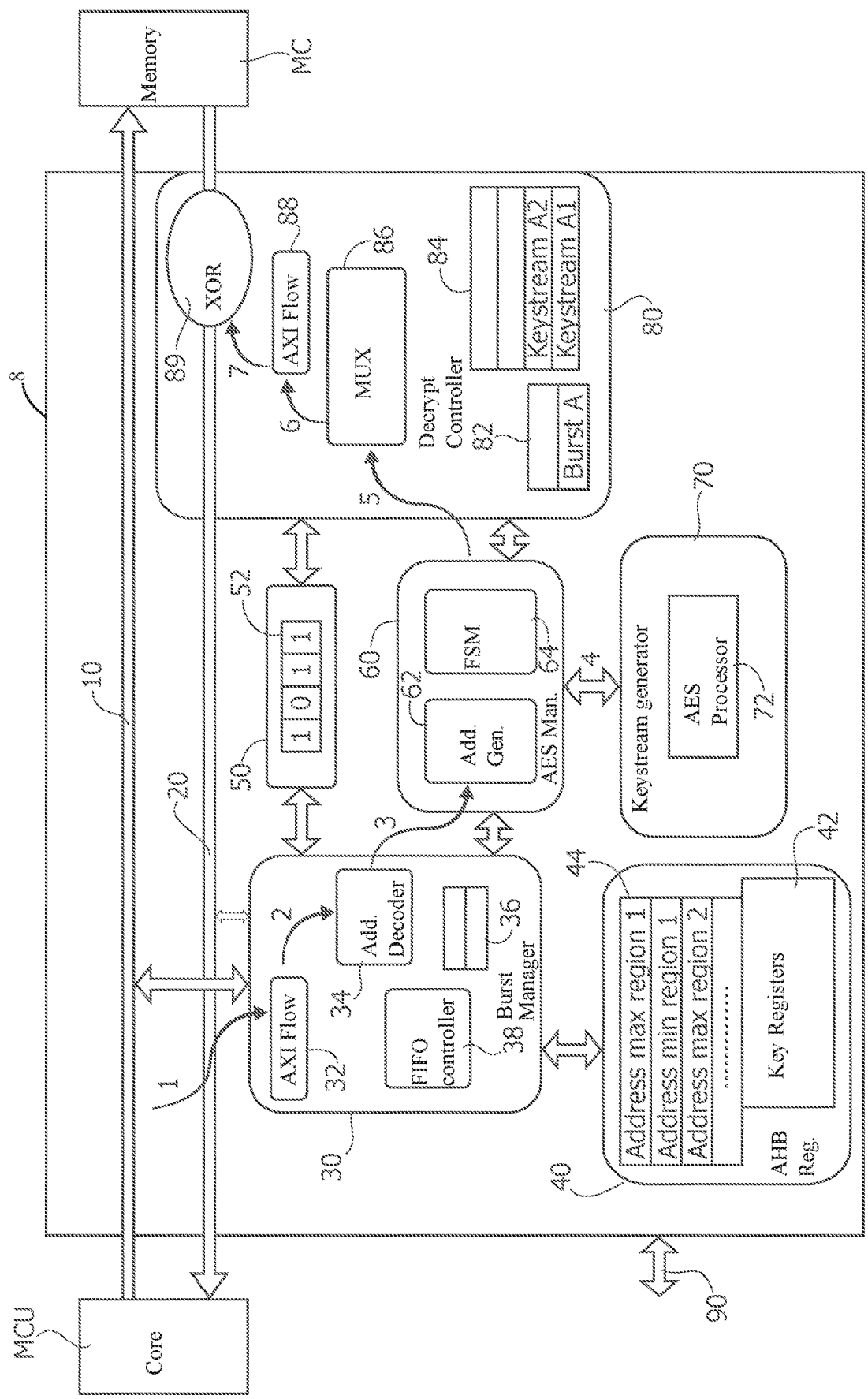
FIG. 1 is exemplary of a possible context of use of embodiments.
Figure 3:
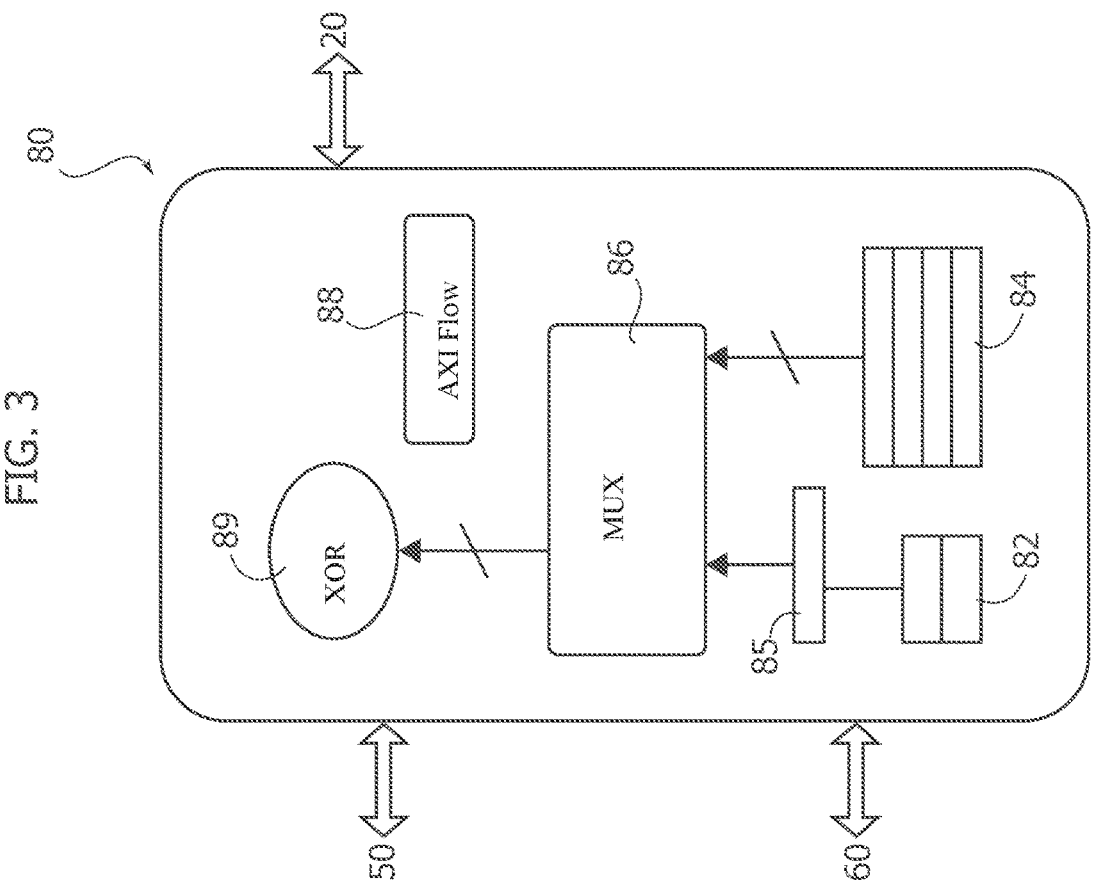
FIG. 3 is a diagram exemplary of a circuit in embodiments.

FIG. 1 is representative of a top level architecture of a so-called "IP core," with the arrows 1-7 showing the temporal and logic flow of the data decryption process, and the corresponding pipeline.

In the following, registers operating according to the "first in, first out" method are briefly referred to as FIFO registers. Possible implementations of such registers are well known to the person skilled in the art and therefore will not be further explained herein.

In the diagram of FIG. 1, which provides a high-level exemplary representation of a decryption circuit 8 according to one or more embodiments, the following elements are exemplified:

access points to an AXI address read channel 10 and/or to an AXI data read channel 20 of an AXI bus, the AXI bus being adapted, e.g., for cooperating with an external memory MC, a burst manager circuit module 30, an Advanced High-performance Bus (AHB) registers circuit module 40, a crypt/decrypt outstanding FIFO circuit module 50, an AES manager circuit module 60, a keystream generator circuit module 70, a decrypt controller circuit module 80, and an access point to an AHB communication bus 90.

It will be appreciated that the representation of the circuit modules above as distinct entities is merely for the sake of clarity and simplicity. In one or more embodiments, one or more of those circuit modules may be integrated in the form of multi-function circuits. Similarly, in one or more embodiments, one or more of the circuit modules exemplified herein may split into corresponding sets of sub-modules.

Therefore, the above-mentioned circuit modules as exemplified in FIG. 1 may in turn comprise various sub-modules, as discussed in the following.

For instance:

the burst manager circuit module 30 may comprise an AXI flow control module 32, an address decoding module 34, a burst FIFO register 36, and a burst FIFO controller module 38;

the AHB registers circuit module 40 may comprise a key registers module 42 and an address region registers module 44, the crypt/decrypt outstanding FIFO circuit module 50 may comprise a crypt/decrypt FIFO register 52;

the AES manager circuit module 60 may comprise an address generation module 62 and a finite state machine (FSM) module 64;

the keystream generator circuit module 70 may comprise an AES processing module 72;

the decrypt controller circuit module 80 may comprise a burst info FIFO register 82, a mask FIFO register 84, a multiplexer (MUX) module 86 (e.g., a 64-bit multiplexer), an AXI flow control module 88, and a XOR logic module 89.

As noted, also the representation of the circuit sub-modules above as distinct entities is merely for the sake of clarity and simplicity. In one or more embodiments, one or more of those circuit sub-modules may be integrated in the form of multi-function modules.

In one or more embodiments, the address region registers module 44 and the key registers module 42 may be programmed and/or configured by using, e.g., the access point to the AHB communication bus 90.

One or more embodiments are suitable to be plugged on an AXI bus for cooperation with the memory MC, which preferably includes a memory controller, the AXI bus being operated in the so-called "burst mode," that is with data transaction requests being burst requests.

An AXI "burst" is a data transaction in which multiple data items (or "data units") are transferred (e.g., from the external memory MC over the AXI data read channel 20) based upon a single data address. Each data unit transferred in a single burst is referred to as a "beat," and the same wording applies to the present description. Since, in embodiments as exemplified, each burst is associated with a single data start address, the addresses of the beats in a burst are calculated as a function of the corresponding data start address and the transaction type (or equivalently burst type), e.g., fixed, incremental, or wrapping. An access request to a single data unit (i.e., a single "beat") in the external memory MC is also defined as a burst request, i.e., a burst requesting transfer of a single beat.

In one or more embodiments, as exemplified herein, a data access request (and possibly a data decryption request) is issued on the AXI address read channel 10 as a result of the arrival of an AXI burst. The AXI burst carries information comprising:

the start address of the corresponding data units to be retrieved in the external memory MC (e.g., a single 32-bit address), the length of the data transaction (i.e., the number of data beats in the "response data transfer," also called "burst length"), the size of the data units (i.e., the number of significant bits occupied by the retrieved data units in the AXI data read channel 20, also called "burst size"), the burst type (or "transaction type"), e.g., fixed, incremental, or wrapping, in case of wrapping bursts, the burst length for wrapping, and possible other information items about security, cachability, and so on.

In one or more embodiments, the AXI flow control module 32 may be configured to monitor the status of the decryption processing pipeline, and the processing of the incoming data decryption request may be granted if the processing pipeline is not full.

If processing of the incoming request is granted, the AXI burst is forwarded (with no retiming) to the external memory MC for retrieving the corresponding data, which may be encrypted or not encrypted.

In one or more embodiments, the address decoding module 34 may be configured to decode the data start address carried by the incoming AXI burst and other sideband security information. The address decoding module 34 may compare the data start address with the address regions in the address region registers module 44 and may compare the security information with the security programmed in the key registers module 42. As a result of such comparisons, the address decoding module 34 may operate a decision as to whether the data corresponding to the incoming burst require a decryption process or not.

In one or more embodiments, the address decoding module 34 may work "on the fly," i.e., without introducing any delay cycle. In case the data corresponding to the incoming burst require a decryption process, the AXI flow control module 32 may be configured to forward the burst information to the address generation module 62 if the address generation module 62 is available for processing the current burst, or to store the burst information in the burst FIFO register 36 if the address generation module 62 is not available for processing the current burst (e.g., because it is processing the information of a previous burst). The AXI flow control module 32 may be aware that the burst FIFO register 36 is full; in such case, the decryption of data corresponding to the incoming burst is not granted.

In one or more embodiments, parallel processing may allow filling the crypt/decrypt FIFO register 52 in parallel to the operation of the address generation module 62. For instance, if the decision is to decrypt the data corresponding to the incoming burst, the value "1" is written ("pushed") in the crypt/decrypt FIFO register 52, otherwise, although no information is written in the burst FIFO 36, the value "0" is written ("pushed") inside the crypt/decrypt FIFO register 52.

Based on the working principle of FIFO registers, the binary sequence stored in the crypt/decrypt FIFO register 52 is read back by the decrypt controller circuit module 80, e.g., as a result of a response data sequence being retrieved from, e.g., the external memory MC. Reading the values stored in the crypt/decrypt FIFO register 52 will facilitate taking a decision to decrypt the corresponding data using the available masks as described in the following (if a "1" was stored in the crypt/decrypt FIFO register 52), or to directly forward back the response data without applying decryption processing (if a "0" was stored in the crypt/decrypt FIFO register 52). In this latter case, corresponding to burst requests for non-encrypted data units, information about such burst requests for non-encrypted data units may thus not be written in the burst FIFO 36.

It will be appreciated that referring to "1" and "0" values, respectively, is merely by way of example: one or more embodiments may in fact adopt a complementary choice (e.g., "0" and "1" values, respectively), or any other suitable Boolean encoding of such information.

In one or more embodiments, if the decision is to decrypt the retrieved data, multiple processing activities may be executed in parallel, e.g., being triggered by a burst being forwarded to the AES manager module 60, the processing activities comprising the AES mask computation, and/or the address generation, and/or the mask header calculation.

In general, at high clock frequency (e.g., more than 300 MHz), several clock cycles may be used to generate one decryption mask, e.g., one 128-bit mask. For instance, AES counter algorithm may use, e.g., 11 clock cycles to generate one 128-bit decryption mask.

It will be appreciated that, in the context of the present description, the terms "mask" and "keystream" are used indifferently. Indeed, keystream is the technical denomination used in the context of the AES procedure to indicate the mask to be used for the decryption process of the encrypted data.

An AES procedure as adopted in one or more embodiments may comprise an AES counter procedure. An AES counter procedure may facilitate computing decryption masks as a function of the burst start addresses and other information carried by the corresponding bursts.

In one or more embodiments, the AES procedure may be triggered for the generation of decryption masks for the decryption of data units of a certain burst by providing input data to the AES processing module 72. For instance, such input data to the AES processing module 72 may comprise a secret key (e.g., a 128-bit secret key) and an initialization vector (e.g., a 128-bit initialization vector).

In one or more embodiments, the AES processing module 72 may retrieve the secret key from the registers in the key registers module 42.

In one or more embodiments, an initialization vector may be computed by the AES manager circuit module 60 as a function of the start address and other information carried by the corresponding burst, as discussed previously.

As noted, an AES counter procedure may facilitate computing decryption masks as a function of the burst start addresses and other information carried by the corresponding bursts.

In one or more embodiments, "concise" information related to, e.g., burst type (e.g., fixed, incremental, or wrapping), burst start address, data units size, burst length, length for wrap, etc. may be extracted and associated to each burst, and saved as "mask header" into the burst info FIFO register 82.

The generated masks may be pushed into the mask FIFO register 84, and the computed mask headers may be pushed into the burst info FIFO register 82. For instance, multiple masks may correspond to a single mask header (and therefore to a single burst request), e.g., due to the big length of the burst (i.e., due to a high number of data units, or data "beats," in the "response data transfer").

In one or more embodiments, if response data are retrieved from an external memory MC and sent back to the decryption module over the AXI data read channel 20 and decryption masks are available, the decrypt controller circuit module 80 may start reading the data stored in the burst info FIFO register 82 and in the mask FIFO register 84, i.e., "popping" such data from the FIFO registers, starting the association of each data beat in the response data transfer with the corresponding mask, or possibly with the corresponding mask portion in case the data units have a size smaller than the masks (e.g., if data units are 64-bit long and masks are 128-bit long). Such computation may be executed, for instance, in parallel with the response address generation.

In one or more embodiments, the response data flow may be stopped if the retrieved data units are encrypted, and masks are not available.

In one or more embodiments, the decryption processing performed by the XOR logic module 89 for the applied AES procedure may consist in XORing, bit by bit, encrypted data (i.e., the so-called "ciphertext") and computed mask. This XOR operation returns the decrypted data, i.e., the so-called "plaintext."

The burst "outstanding" capability may be critical for the decryption process. It can impact the performance of the application, for instance the execution of the code or an image processing.

One or more embodiments of the described architecture may be able to manage up to N outstanding bursts, N depending also on the dimensions (or "depths") of the implemented FIFO registers, e.g., the burst FIFO register 36, the crypt/decrypt FIFO register 52, the burst info FIFO register 82 and the mask FIFO register 84. Such possibility of managing up to N outstanding bursts arises from the partition of the decryption processing pipeline in different stages and from the exploitation of parallel processing.

In one or more embodiments, while AXI requests are waiting for the corresponding response, the AES procedure may be continuously triggered to generate the required masks, thus facilitating increasing the performance of the core and/or taking advantage of the cache refill.

As previously noted, a possible application for a decryption method as exemplified herein is, for instance, the execution of encrypted code, e.g., stored in an external memory MC, by a processing core or microcontroller MCU. For instance, caching may be applied to "anticipate" the execution of commands and to improve the performance of the processing core MCU. As a result of the processing core MCU executing a certain instruction, caching may "speculate" on the successive instructions to be performed by the processing core MCU, and may try to retrieve such instructions from an external memory MC for possible use in successive processing.

Therefore, in one or more embodiments, receiving a burst request for encrypted data units stored in the external memory MC, the encrypted data units corresponding, e.g., to certain code instructions for execution by the processing core MCU, may trigger a "speculative" prediction of burst requests for encrypted data units stored in the external memory MC at successive addresses.

Figure 2:
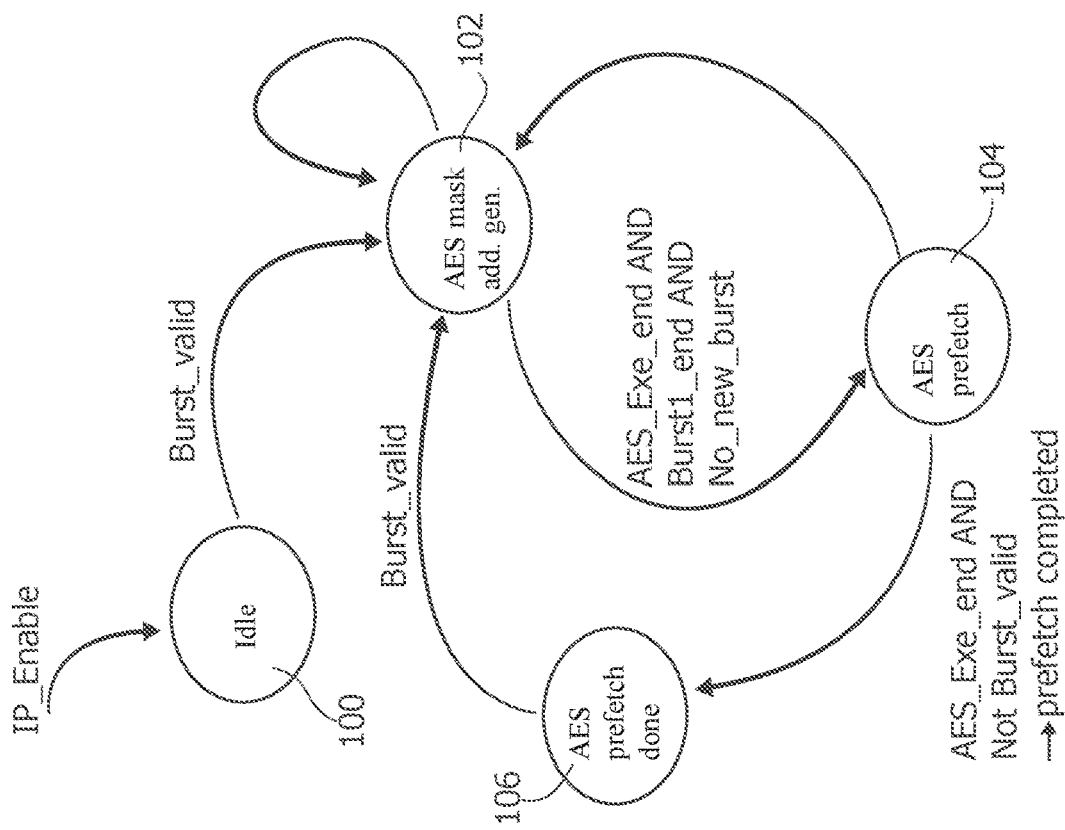
FIG. 2 is exemplary of possible operation of a finite state machine in embodiments.

In one or more embodiments, triggering of the AES procedure for mask generation may be managed by the FSM module 64, as exemplified in FIG. 2. For instance, the FSM module 64 may trigger the generation of masks for the decryption of such "speculated" successive bursts when the keystream generator circuit module 70 is free.

In one or more embodiments, the address generation may comprise two phases, the first phase being the generation of all the mask addresses for the incoming bursts, and the second phase being the generation of "subsequent" mask addresses, e.g., by performing "speculative" triggering of the AES mask generation.

In one or more embodiments, before starting any speculation on possible "subsequent" mask addresses, it is preferable to complete the generation of the addresses corresponding to the bursts received and potentially stored into the FIFO registers. A single burst can indeed cover (due to potentially big burst "length," i.e., a high number of data beats in the "response data transfer") a large memory area, possibly involving more than one mask (e.g., more than one 128-bit mask).

In one or more embodiments, the address generation process, based on the burst start address, burst length, burst size, and burst type (e.g., fixed, wrapping, or incremental), can be complex depending on the burst length.

For instance, the address generation process may be complex due to the necessity of computing sums and products between "long" numbers (e.g., 128-bit numbers).

Therefore, in one or more embodiments the address generation process is preferably addressed step by step by the FSM module 64 and may proceed in parallel with the AES mask computation.

As a result of the address generation process being completed (i.e., all the mask addresses for the incoming bursts having been computed) and the keystream generator circuit module 70 being free again, speculation about the next incoming burst that can be received on the AXI address read channel 10 may be performed.

It will be appreciated that the term "subsequent" previously used has also to be interpreted in a "smart" way, meaning that in the case of a "wrapping" address burst, the address to be predicted is probably not linked to the start address of the burst, but to the "final" last address computed by the FSM module 64, because presumably the operation of the core will progress from that point.

In one or more embodiments, the FSM module 64 may be configured to operate as a finite state machine having the behavior exemplarily described in FIG. 2.

The finite state machine may have an "IDLE" state 100, an "AES mask address generation" state 102, an "AES prefetch" state 104 and an "AES prefetch done" state 106.

The IDLE state 100 may be reached only as a result of resetting the whole decryption circuit or as a result of receiving an "IP_Enable" signal. As a result of the FSM being in the IDLE state 100, the AES processing module 72 is free (i.e., the AES procedure is not running) and there is no burst to be decrypted. Receiving a "burst_valid" signal, indicative of a valid incoming burst being received on the address read channel 10, may trigger the decryption flow, causing the FSM to shift to the AES mask address generation state 102.

As a result of the FSM being in the AES mask address generation state 102, the AES processing module 72 may be activated. More than one clock cycle, e.g., 11 clock cycles, may be required to complete the mask generation. At the same time, the computation of the next mask address may be ongoing. Reaching the end of the mask address generation process in absence of any following burst available on the address read channel 10 may trigger the AES prefetch phase, causing the FSM to shift to the AES prefetch state 104.

In one or more embodiments the AES processing module 72 may be activated as a result of the FSM transitioning to the AES prefetch state 104, with at least one mask address being prefetched.

The prefetch processing can be aborted at any moment, e.g., in case an incoming burst, triggering a "burst_valid" signal, has an address that is different from the address which has been "speculated." In this case, the AES standard flow is activated. In any case a "burst_valid" signal will cause the FSM to shift to the AES mask address generation state 102. Reaching the end of the mask address prefetch process in absence of a "burst_valid" signal may cause the FSM to shift to the AES prefetch done state 106.

As a result of the FSM being in the AES prefetch done state 106, a successfully prefetched mask is temporarily stored in the mask FIFO register 84, waiting for a new burst. The AES processing module 72 may be kept on hold. As a result of receiving a "burst_valid" signal, the standard flow may be activated again.

In one or more embodiments, the decrypt controller circuit module 80 may be responsible for the XORing operation between response data units and corresponding decryption masks.

As previously noted, significant and concise information may be extracted, for each incoming burst, from the AXI burst by the FSM module 64, and stored as "mask header" in the burst info FIFO register 82 to manage the response data flow. In one or more embodiments, this concise information may comprise:

- a "burst_type" field, e.g., encoded in 2 bits, providing information about the type of the corresponding burst, e.g., fixed, incremental, or wrapping;
- a "start_address" field, e.g., encoded in 5 bits, providing the start address of the data of the burst to be retrieved, e.g., in an external memory;
- a "size" field, e.g., encoded in 3 bits, providing information about the size of the data units in the corresponding burst;
- a "length_for_wrapping" field, e.g., encoded in 2 bits, providing information about the address range covered by the burst and explored by the decrypt controller circuit module 80 in the case of a "wrapping" burst.

For instance, a possible encoding for the "length_for_wrapping" field in the case of a 2-bit values encoding may be the following:

- "00": wrap after 2 bytes,
- "01": wrap after 4 bytes,
- "10": wrap after 8 bytes, and
- "11": wrap after 16 bytes.

As exemplified above, the information required for the correct decryption of the retrieved data units may be stored in a single header for each incoming burst, each header having the size of, e.g., 12 bits. Therefore, one or more embodiments may facilitate a reduction of the circuit area by improving the mask/data selection and association procedure.

In one or more embodiments, the decrypt controller circuit module 80 may compute the current data addresses (offsets) for data beats in a burst requiring decryption processing, according to the algorithm described in the following.

At the beginning of the decryption process of a certain burst, a start address, whose size in bit may be dependent on the size in bit of the AXI bus, e.g., being encoded in 5 bits in the case of a 64-bit AXI bus, may be initialized accordingly to the burst start address as stored in the corresponding data entry in the burst info FIFO register 82.

As a result of a data beat being retrieved from the external memory MC and being available on the AXI data read channel 20 for processing in the decrypt controller module 80, a "rvalid" signal may be triggered (e.g., set to "1"), readable by the decrypt controller circuit module 80.

In one or more embodiments, the current data address may therefore be computed in different manners according to the type of the corresponding burst. If the burst is of the "fixed" type, the start address is not incremented and one single mask is used for all the data beats comprised in the same burst. If the burst is of the "incremental" type, the current data address in computed by incrementing, at each occurrence of the "rvalid" signal, the burst start address by the size of the data beats (e.g., 4 bytes). If the burst is of the "wrapping" type, the current data address is computed by incrementing, at each occurrence of the "rvalid" signal, the burst start address by the size of the data beats (e.g., 4 bytes), wrapping (e.g., going back to the initial start address) at length_for_wrapping*size.

In one or more embodiments, the XOR operation, if required, is performed by the XOR logic module 89 on the whole data bus, e.g., the whole 64-bit AXI bus.

In one or more embodiments, one bit of the current data address (e.g., the fourth rightmost bit) may be used as a selector for deciding which portion of the mask should be used in the XOR operation (for instance, the first or the second half of the mask). For instance, in the case of a 128-bit mask and a 64-bit AXI data bus, if the value of the selector bit is equal to "0" then the first half of the mask may be used (i.e., the part of the mask identified by bits 63:0), while if the value of the selector bit is equal to "1" then the second half of the mask may be used (i.e., the part of the mask identified by bits 127:64).

It will be appreciated that, also in this case, referring to "1" and "0" values, respectively, is merely by way of example: one or more embodiments may in fact adopt a complementary choice (e.g., "0" and "1" values, respectively) or any other suitable Boolean encoding of such information.

In one or more embodiments, one bit of the current data address (e.g., the fifth rightmost bit) may be used as a trigger for a mask change. For instance, a change in the value of such "mask change trigger" bit, either from "0" to "1" or from "1" to "0," may trigger the "popping" of a decryption mask from the mask FIFO register 84.

As a result of the last data beat corresponding to a certain burst request being retrieved from the external memory MC and being available on the AXI data read channel 20 for processing in the decrypt controller module 80, a "rlast" signal may be triggered (e.g., set to "1"), readable by the decrypt controller circuit module 80. Such "rlast" signal being equal to "1" may notify to the decrypt controller circuit module 80 that the "end" of the response data flow corresponding to a certain burst request has been reached.

It will otherwise be appreciated that the above-mentioned sizes (e.g., the AXI data bus size, the mask size, the FIFO registers depth, the mask header size, the start address size, etc.) and the positions of the selector bit and of the mask change trigger bit in the current data address can be generalized without departing from the extent of protection.

In one or more embodiments a method may comprise:

receiving (e.g., 32) over an AXI bus (e.g., 10) data access requests for data units stored in a memory (e.g., MC), wherein the AXI bus may operate in burst mode, wherein the requests may comprise burst requests for access to respective sets of data units stored in the memory starting from respective data start addresses, and the burst requests may convey the respective data start addresses and security information, indicative, e.g., of whether the data units requested in the burst requests are encrypted or non-encrypted data units;

reading (e.g., 34) the data start addresses and the security information conveyed by the burst requests, thereby subdividing the burst requests received, as a function of the data start addresses and the security information, into burst requests for encrypted data units and burst requests for non-encrypted data units, wherein both burst requests for encrypted data units and burst requests for non-encrypted data units may be forwarded towards the memory (e.g., MC) and the respective sets of data units may be retrieved from the memory (e.g., MC) over an AXI bus (e.g., 20).

In one or more embodiments, Advanced Encryption Standard (AES) processing (e.g., 60, 70, 80) may be applied to the burst requests for encrypted data units, e.g., by calculating (e.g., 72) decryption masks for the encrypted data units and applying (e.g., 80) the decryption masks calculated to the encrypted data units retrieved.

In one or more embodiments, an AXI bus may comprise an address read channel (e.g., 10) and a data read channel (e.g., 20).

In one or more embodiments, a method may comprise receiving (e.g., 32) the data access requests over the address read channel (e.g., 10) and retrieving from the memory (e.g., MC) the respective sets of data units over the data read channel (e.g., 20).

In one or more embodiments, subdividing the burst requests received, as a function of data start addresses and security information, in burst requests for encrypted data units and burst requests for non-encrypted data units, may comprise:

comparing the security information with the security instructions stored in a register (e.g., 42), and comparing the data start addresses with the ranges of addresses stored in a register (e.g., 44).

In one or more embodiments, a method may comprise applying Advanced Encryption Standard (AES) processing (e.g., 60, 70, 80) to the burst requests for encrypted data units via a decryption processing pipeline (e.g., 3, 4, 5, 6, 7).

In one or more embodiments, a method may comprise checking (e.g., 32) whether the decryption processing pipeline is available for processing incoming burst requests for encrypted data units.

In one or more embodiments, incoming burst requests for encrypted data units may be stored (e.g., 38) in a FIFO register (e.g., 36) as a result of the decryption processing pipeline being unavailable.

In one or more embodiments, applying said Advanced Encryption Standard, AES, processing may comprise applying an AES counter procedure.

In one or more embodiments, applying Advanced Encryption Standard (AES) processing (e.g., 60, 70, 80) may comprise applying (e.g., 89) bitwise XOR processing between the encrypted data units retrieved and the decryption masks calculated.

In one or more embodiments, requests for data units received (e.g., 32) over an AXI bus (e.g., 10) may convey, along with respective data start addresses and security information, supplemental information on, e.g., data unit size, burst request type and burst request lengths.

In one or more embodiments, a method may comprise receiving data unit availability signals indicative of availability of data units from the memory (e.g., MC).

In one or more embodiments, a method may comprise applying (e.g., 89) calculated decryption masks to encrypted data units out of data units available from the memory by calculating (e.g., 62), for instance as a function of the data unit availability signals and the supplemental information, current data addresses (e.g., 85) for the encrypted data units and selecting (e.g., 86, 88) the decryption masks applied to the encrypted data units, for instance, as a function of the current data addresses (e.g., 85).

In one or more embodiments, a method may comprise:
providing in the current data addresses (e.g., 85) for the encrypted data units, at least one mask change control bit, and
changing (e.g., 86) at least one portion of the decryption masks applied to the encrypted data units, for instance as a result of changes of the value of the at least one mask change control bit.

In one or more embodiments, a method may comprise:
calculating (e.g., 72) decryption masks for the encrypted data units by providing plural mask portions (e.g., 84) applicable to different encrypted data units,
providing in the current data addresses (e.g., 85) for the encrypted data units, a first mask change control bit and a second mask change control bit,
changing (e.g., 86) the decryption masks applied to the encrypted data units, for instance as a result of changes of the value of the first mask change control bit, and
changing (e.g., 86) the portions of the decryption masks applied to the encrypted data units, for instance as a result of changes of the value of the second mask change control bit.

One or more embodiments may comprise:
calculating, as a function of the data unit availability signals and the supplemental information, current data addresses (e.g., 85) for the encrypted data units,
in the presence of burst requests received over the AXI bus (e.g., 10), calculating the decryption masks as a function of, e.g., respective data start addresses, burst request type, and burst request length information therein,
in the absence of burst requests received over the AXI bus (e.g., 10), calculating a set of candidate decryption masks applicable to future incoming burst requests for encrypted data units as a function of at least one of, e.g., the data start address of the last received burst request for encrypted data units, the current data unit address calculated for said last received burst request for encrypted data units, and burst type.

One or more embodiments may comprise storing (e.g., 84) at least one decryption mask out of a set of candidate decryption masks.

One or more embodiments may comprise, in the absence of burst requests received over the AXI bus (e.g., 10), calculating a set of candidate data addresses of encrypted data units in future incoming burst requests as a function of at least one of, e.g., the data start address of the last received burst request for encrypted data units, the current data unit address calculated for said last received burst request for encrypted data units, and the burst type.

In one or more embodiments, a circuit may comprise:
an input node (e.g., 32), for instance configured for receiving over an AXI bus (e.g., 10) data access requests for data units stored in a memory (e.g., MC), wherein the AXI bus (e.g., 10) may operate in a burst mode, wherein the requests may comprise burst requests for access to respective sets of data units stored in a memory (e.g., MC) starting from respective data start addresses and the burst requests may convey respective data start addresses and security information indicative of whether the data units requested in the burst requests are encrypted or non-encrypted data units;
a read circuit block (e.g., 34) coupled to the input node (e.g., 32), the read circuit block configured to read (34) the data start addresses and the security information conveyed by the burst requests, thereby subdividing the burst requests received, for instance as a function of the data start addresses and the security information, into burst requests for encrypted data units and burst requests for non-encrypted data units, wherein both burst requests for encrypted data units and burst requests for non-encrypted data units may be forwarded towards the memory (e.g., MC) and the respective sets of data units may be retrieved from the memory (e.g., MC) over an AXI bus (e.g., 20);
processing circuitry (e.g., 60, 70, 80) configured to apply Advanced Encryption Standard (AES) processing to the burst requests for encrypted data units according to the method of one or more embodiments.

In one or more embodiments, a device may comprise:
a memory (e.g., MC) for storing data units,
an AXI bus configured (e.g., 10) to convey data access requests for data units stored in the memory (e.g., MC), wherein the AXI bus (e.g., 10) may be operated in a burst mode, wherein the requests may comprise burst requests for access to respective sets of data units stored in the memory (e.g., MC) starting from respective data start addresses, and the AXI bus may be configured (e.g., 20) to convey respective sets of data units retrieved from the memory (e.g., MC) as a result of the data access requests;
a circuit according to one or more embodiments, the circuit having an input node (e.g., 32) configured for receiving over an AXI bus (e.g., 10) data access requests for data units stored in a memory (e.g., MC), wherein the AXI bus (e.g., 10) may operate in a burst mode, wherein the requests may comprise burst requests for access to respective sets of data units stored in the memory (e.g., MC) starting from respective data start addresses, and the burst requests may convey respective data start addresses and security information indicative of whether the data units requested in the burst requests are encrypted or non-encrypted data units; the circuit may be coupled (e.g., 32, 88) to the AXI bus (e.g., 10, 20) to receive the burst requests and the respective sets of data units retrieved from the memory (e.g., MC).

Without prejudice to the underlying principles, the details and embodiments may vary, even significantly, with respect to what has been described by way of example only, without departing from the extent of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving over an Advanced Extensible Interface (AXI) bus data access requests for data units stored in a memory, wherein the AXI bus operates in burst mode, wherein the requests comprise burst requests for access to respective sets of data units stored in the memory starting from respective data start addresses, the burst requests conveying said respective data start addresses and security information indicative of whether the data units requested in the burst requests are encrypted or non-encrypted data units, wherein said requests for data units received over the AXI bus convey, along with said respective data start addresses and security information, supplemental information on data unit size, burst request type, and burst request lengths;
receiving data unit availability signals indicative of availability of data units from the memory;
reading the data start addresses and the security information conveyed by the burst requests, subdividing the burst requests received, as a function of said data start addresses and said security information, into burst requests for encrypted data units and burst requests for non-encrypted data units, forwarding both the burst requests for encrypted data units and the burst requests for non-encrypted data units towards the memory, and retrieving the encrypted and non-encrypted data units from the memory over the AXI bus; and
applying Advanced Encryption Standard (AES) processing to the burst requests for encrypted data units by calculating decryption masks for the encrypted data units and applying the decryption masks to the encrypted data units retrieved, wherein applying the decryption masks includes applying the decryption masks to encrypted data units out of data units available from the memory by:
calculating, as a function of said data unit availability signals and said supplemental information, current data addresses for said encrypted data units, and
selecting the decryption masks applied to said encrypted data units as a function of the current data addresses calculated.

2. The method of claim 1, wherein the AXI bus comprises an address read channel and a data read channel and the method comprises receiving the data access requests over the address read channel and retrieving from the memory the encrypted and non-encrypted data units over the data read channel.

3. The method of claim 1, wherein subdividing the burst requests received, as a function of said data start addresses and said security information, in burst requests for encrypted data units and burst requests for non-encrypted data units, comprises:
comparing said security information with security instructions stored in a register, and
comparing said data start addresses with ranges of addresses stored in a register.

4. The method of claim 1, wherein applying AES processing includes applying AES processing to the burst requests for encrypted data units via a decryption processing pipeline, the method comprising checking whether the decryption processing pipeline is available for processing incoming burst requests for encrypted data units, and if the decryption processing pipeline is unavailable, storing incoming burst requests for encrypted data units in a FIFO register.

5. The method of claim 1, wherein applying AES processing comprises applying an AES counter procedure.

6. The method of claim 1, wherein applying said AES processing comprises applying bitwise XOR processing between retrieving the encrypted data units retrieved and calculating the decryption masks.

7. The method of claim 1, comprising:
providing in said current data addresses for said encrypted data units, at least one mask change control bit, and
changing at least one portion of the decryption masks applied to said encrypted data units as a result of changes of a value of said at least one mask change control bit.

8. The method of claim 7, wherein calculating the decryption masks for the encrypted data units includes providing in the decryption masks plural mask portions applicable to different encrypted data units, the method further comprising:
providing, in said current data addresses for said encrypted data units, a first mask change control bit and a second mask change control bit,
changing the decryption masks applied to said encrypted data units as a result of changes of the value of said first mask change control bit, and
changing the portions of said decryption masks applied to said encrypted data units as a result of changes of the value of said second mask change control bit.

9. The method of claim 1, wherein:
calculating said decryption masks includes, in the presence of burst requests received over the AXI bus, calculating said decryption masks as a function of respective data start addresses, burst request type, and burst request length information, and
calculating said decryption masks includes, in the absence of burst requests received over the AXI bus, calculating a set of candidate decryption masks applicable to future incoming burst requests for encrypted data units as a function of at least one of the data start address of the last received burst request for encrypted data units, the current data unit address calculated for said last received burst request for encrypted data units, and burst type and storing at least one decryption mask out of said set of candidate decryption masks.

10. A circuit, comprising:
an input node configured to receive over an AXI bus data access requests for data units stored in a memory, wherein the AXI bus operates in a burst mode, wherein the requests comprise burst requests for access to respective sets of data units stored in the memory starting from respective data start addresses, the burst requests conveying respective data start addresses and security information indicative of whether the data units requested in the burst requests are encrypted or non-encrypted data units, wherein said requests for data units received over the AXI bus convey, along with said respective data start addresses and security information, supplemental information on data unit size, burst request type and burst request lengths;
a read circuit block coupled to the input node, the read circuit block being configured to receive data unit availability signals indicative of availability of data units from the memory, read the data start addresses and the security information conveyed by the burst requests, subdivide the burst requests, as a function of said data start addresses and said security information, into burst requests for encrypted data units and burst requests for non-encrypted data units, and cause both burst requests for encrypted data units and burst requests for non-encrypted data units to be forwarded towards the memory and the respective sets of data units to be retrieved from the memory over the AXI bus; and processing circuitry configured to apply Advanced Encryption Standard, AES, processing to the burst requests for encrypted data units by calculating decryption masks for the encrypted data units and applying the decryption masks to the encrypted data units retrieved, wherein applying the decryption masks includes applying the decryption masks to encrypted data units out of data units available from the memory by:

calculating, as a function of said data unit availability signals and said supplemental information, current data addresses for said encrypted data units, and selecting the decryption masks applied to said encrypted data units as a function of the current data addresses calculated.

11. The circuit of claim 10, wherein the input node is configured to receive the data access requests over an address read channel of the AXI bus and retrieve from the memory the encrypted and non-encrypted data units over a data read channel of the AXI bus.

12. The circuit of claim 10, further comprising first and second registers, wherein the read circuit block is configured to subdivide the burst requests by steps including comparing said security information with security instructions stored in the first register and comparing said data start addresses with ranges of addresses stored in the second register.

13. The circuit of claim 10, further comprising a FIFO register, wherein the processing circuitry is configured to apply AES processing to the burst requests for encrypted data units via a decryption processing pipeline, check whether the decryption processing pipeline is available for processing incoming burst requests for encrypted data units, and if the decryption processing pipeline is unavailable, store incoming burst requests for encrypted data units in the FIFO register.

14. The circuit of claim 10, wherein the processing circuitry is configured to change at least one portion of the decryption masks applied to said encrypted data units as a result of changes of a value of at least one mask change control bit received with said current data addresses for said encrypted data units.

15. The circuit of claim 10, wherein the processing circuitry is configured to:

provide in the decryption masks plural mask portions applicable to different encrypted data units;

change the decryption masks applied to said encrypted data units as a result of changes of a value of a first mask change control bit received with said current data addresses for said encrypted data units; and change the portions of said decryption masks applied to said encrypted data units as a result of changes of a value of a second mask change control bit received with said current data addresses for said encrypted data units.

16. The circuit of claim 10, wherein the processing circuitry is configured to:

calculate said decryption masks, in the presence of burst requests received over the AXI bus, as a function of respective data start addresses, burst request type, and burst request length information, calculate said decryption masks, in the absence of burst requests received over the AXI bus, a set of candidate decryption masks applicable to future incoming burst requests for encrypted data units as a function of at least one of the data start address of the last received burst request for encrypted data units, the current data unit address calculated for said last received burst request for encrypted data units, and burst type, and store at least one decryption mask out of said set of candidate decryption masks.

17. A device, comprising:

a memory for storing data units;

an AXI bus configured to convey data access requests for data units stored in the memory, wherein the AXI bus is operable in a burst mode, wherein the requests comprise burst requests for access to respective sets of data units stored in the memory starting from respective data start addresses, the AXI bus being configured to convey respective sets of data units retrieved from the memory as a result of said data access requests, wherein said requests for data units received over the AXI bus convey, along with said respective data start addresses and security information, supplemental information on data unit size, burst request type and burst request lengths;

a circuit that includes:

an input node configured receiving the data access requests from the AXI bus;

a read circuit block coupled to the input node, the read circuit block being configured to receive data unit availability signals indicative of availability of data units from the memory, read the data start addresses and the security information conveyed by the burst requests, subdivide the burst requests, as a function of said data start addresses and said security information, into burst requests for encrypted data units and burst requests for non-encrypted data units, and cause both burst requests for encrypted data units and burst requests for non-encrypted data units to be forwarded towards the memory and the respective sets of data units to be retrieved from the memory over the AXI bus; and processing circuitry configured to apply Advanced Encryption Standard, AES, processing to the burst requests for encrypted data units by calculating decryption masks for the encrypted data units and applying the decryption masks to the encrypted data units retrieved, wherein applying the decryption masks includes applying the decryption masks to encrypted data units out of data units available from the memory by:

calculating, as a function of said data unit availability signals and said supplemental information, current data addresses for said encrypted data units, and selecting the decryption masks applied to said encrypted data units as a function of the current data addresses calculated.

18. The device of claim 17, wherein the AXI bus comprises an address read channel and a data read channel, and the input node is configured to receive the data access requests over the address read channel of the AXI bus and retrieve from the memory the encrypted and non-encrypted data units over the data read channel of the AXI bus.

19. The device of claim 17, wherein the processing circuitry is configured to change at least one portion of the decryption masks applied to said encrypted data units as a result of changes of a value of at least one mask change control bit received with said current data addresses for said encrypted data units.

20. The device of claim 17, wherein the processing circuitry is configured to:
  provide in the decryption masks plural mask portions applicable to different encrypted data units;
  change the decryption masks applied to said encrypted data units as a result of changes of a value of a first mask change control bit received with said current data addresses for said encrypted data units; and
  change the portions of said decryption masks applied to said encrypted data units as a result of changes of a value of a second mask change control bit received with said current data addresses for said encrypted data units.

* * * * *